United States Patent
Sudou

(10) Patent No.: US 8,682,296 B2
(45) Date of Patent: Mar. 25, 2014

(54) PORTABLE ELECTRONIC DEVICE, AUTHENTICATION SYSTEM AND METHOD FOR CONTROLLING PORTABLE ELECTRONIC DEVICE

(75) Inventor: Tomohiro Sudou, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 111 days.

(21) Appl. No.: 13/511,934

(22) PCT Filed: Nov. 26, 2010

(86) PCT No.: PCT/JP2010/071182
§ 371 (c)(1),
(2), (4) Date: May 24, 2012

(87) PCT Pub. No.: WO2011/065509
PCT Pub. Date: Jun. 3, 2011

(65) Prior Publication Data
US 2012/0289199 A1    Nov. 15, 2012

(30) Foreign Application Priority Data
Nov. 27, 2009   (JP) .................................. 2009-270712

(51) Int. Cl.
*H04M 1/66* (2006.01)

(52) U.S. Cl.
USPC ........ 455/411; 455/566; 455/420; 455/550.1; 455/564

(58) Field of Classification Search
USPC ........... 455/410–411, 564, 566, 575.1–575.8, 455/550.1, 556.1, 556.2, 90.3, 418–420
See application file for complete search history.

(56) References Cited

U.S. PATENT DOCUMENTS 5,136,504 A * 8/1992 Fushimoto ............... 704/10
(Continued)

FOREIGN PATENT DOCUMENTS

| JP | 61-49082 A | 3/1986 |
| JP | 2001-193324 A | 7/2001 |

(Continued)

OTHER PUBLICATIONS

International Search Report for PCT/JP2010/071182, mailed Dec. 28, 2010.
(Continued)

*Primary Examiner* — Sharad Rampuria
(74) *Attorney, Agent, or Firm* — Hoffmann & Baron, LLP

(57) ABSTRACT

The mobile electronic device is provided with: a first communication unit which performs communication; an operation unit which includes a plurality of first keys having numbers assigned respectively thereto; a display unit which, in response to the operation of at least one of the plurality of first keys, displays the number assigned to the first key that was operated; and a control unit which, if a passcode request signal is received from the first communication unit at the same time that the number selected by operating one of the first keys while a reference screen was displayed on the display unit is being displayed on the display unit, controls so that the number sequence displayed on the display unit is transmitted to the unit that transmitted the passcode request signal by the first communication unit.

11 Claims, 9 Drawing Sheets

(56) References Cited

U.S. PATENT DOCUMENTS

| | | | | |
|---|---|---|---|---|
| 6,009,338 | A | * | 12/1999 | Iwata et al. ............... 455/575.4 |
| 6,745,053 | B1 | * | 6/2004 | Usami ........................ 455/563 |
| 7,158,776 | B1 | * | 1/2007 | Estes et al. ................. 455/411 |
| 7,697,920 | B1 | * | 4/2010 | McClain ..................... 455/411 |
| 7,948,938 | B2 | * | 5/2011 | Brown et al. ............... 370/329 |
| 8,265,596 | B2 | * | 9/2012 | Shin ............................ 455/410 |
| 2004/0097217 | A1 | * | 5/2004 | McClain ..................... 455/411 |
| 2005/0107127 | A1 | * | 5/2005 | Moriya ....................... 455/566 |
| 2005/0167512 | A1 | | 8/2005 | Minemura et al. |
| 2009/0058816 | A1 | * | 3/2009 | Takeuchi ..................... 345/169 |
| 2011/0171999 | A1 | * | 7/2011 | Tsuboi ........................ 455/566 |

FOREIGN PATENT DOCUMENTS

| | | |
|---|---|---|
| JP | 2002-339608 A | 11/2002 |
| JP | 2005-174185 A | 6/2005 |
| JP | 2006-53851 A | 2/2006 |
| JP | 2009-32209 A | 2/2009 |
| JP | 2009-59264 A | 3/2009 |

OTHER PUBLICATIONS

English abstract of JP 61-49082, published Mar. 10, 1986.

* cited by examiner

| POSITION INFORMATION OF KEY | KEY ASSIGNMENT |
|---|---|
| ⋮ | ⋮ |
| X2, Y1 | 1 |
| X2, Y2 | 2 |
| X2, Y3 | 3 |
| X3, Y1 | 4 |
| X3, Y2 | 5 |
| X3, Y3 | 6 |
| ⋮ | ⋮ |

| POSITION INFORMATION OF KEY | NUMBER OF TIMES KEY IS CONSECUTIVELY DEPRESSED | KEY ASSIGNMENT |
|---|---|---|
| ⋮ | | ⋮ |
| | 1 | あ |
| | 2 | い |
| | 3 | う |
| | 4 | え |
| | 5 | お |
| | | ⋮ |

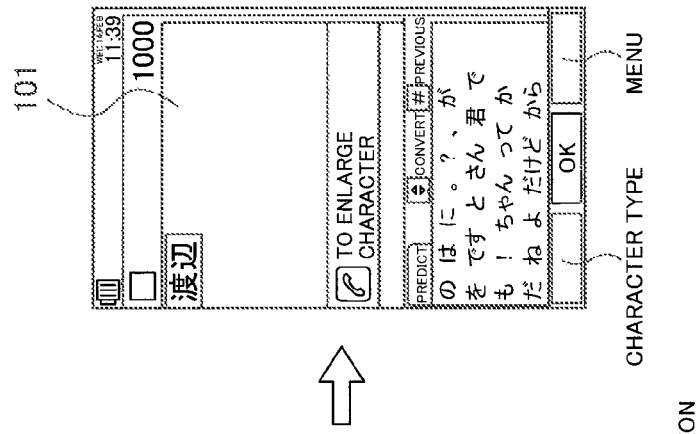
FIG. 4D
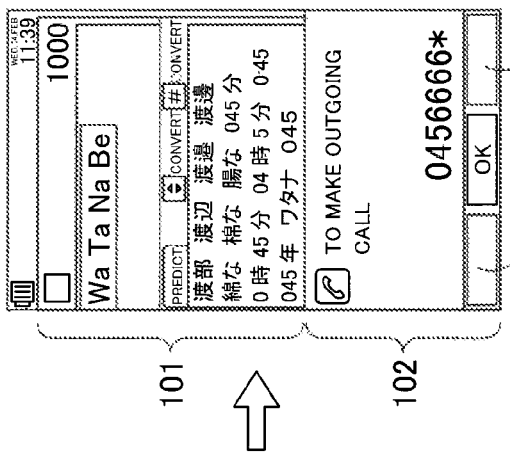
FIG. 4C
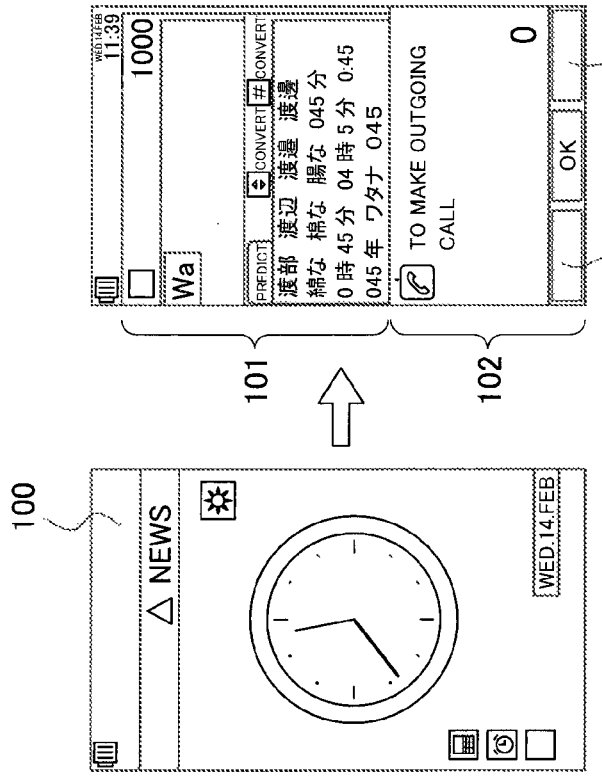
FIG. 4B
FIG. 4A

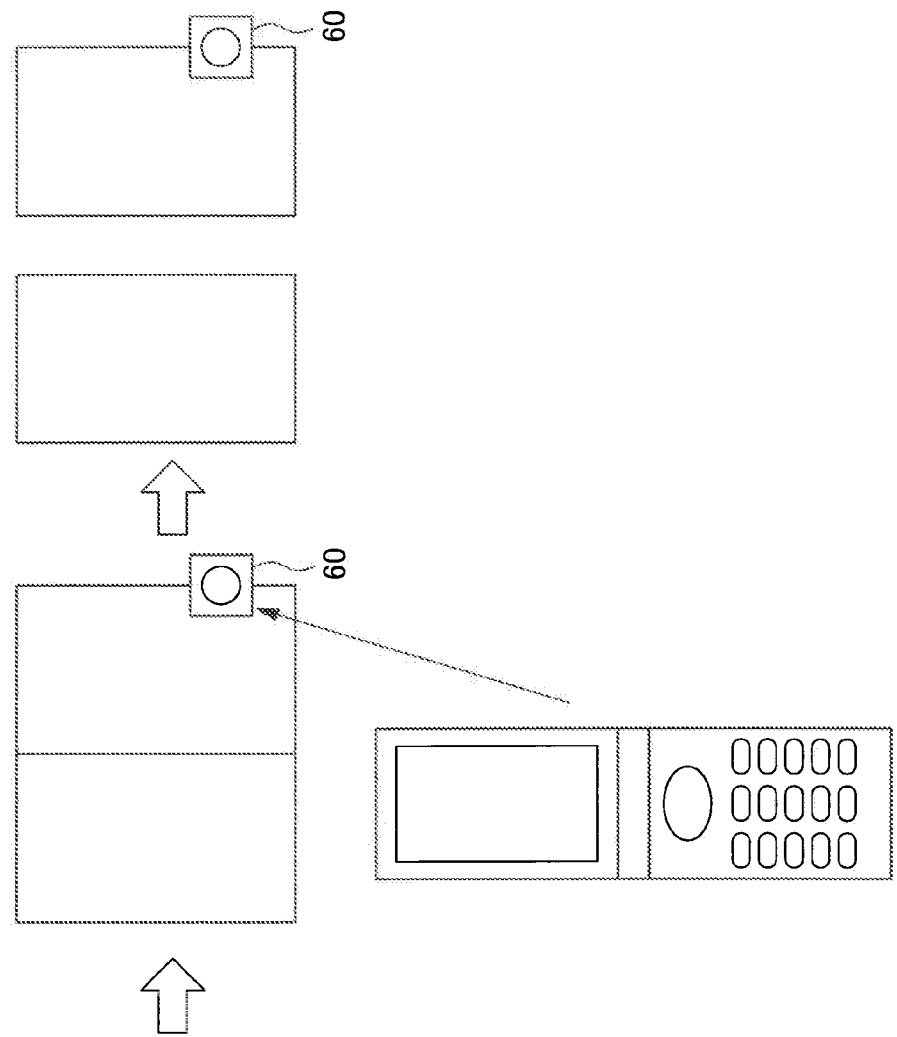
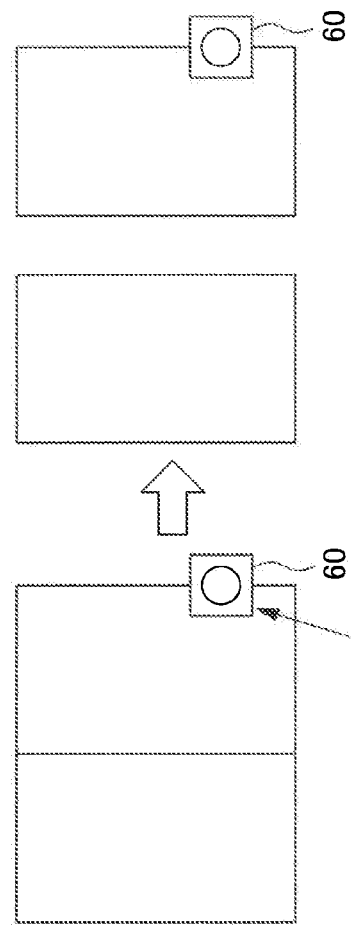
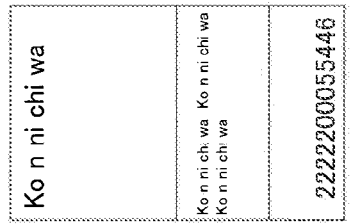
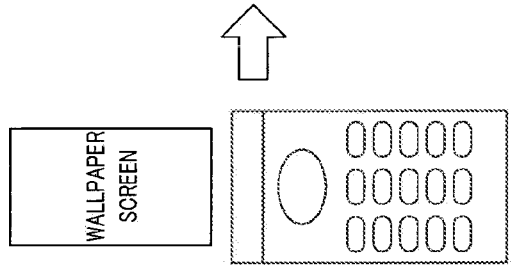

PORTABLE ELECTRONIC DEVICE, AUTHENTICATION SYSTEM AND METHOD FOR CONTROLLING PORTABLE ELECTRONIC DEVICE

CROSS-REFERENCE TO RELATED APPLICATIONS

This application is the National Stage of International Application No. PCT/JP2010/071182, filed Nov. 26, 2010, which claims the benefit of Japanese Application No. 2009-270712, filed Nov. 27, 2009, the entire contents of both of which are incorporated by reference herein.

FIELD OF THE INVENTION

The present invention relates to: a portable electronic device including an operation unit for inputting a character string such as a numeric character string, and a communication unit for externally transmitting the character string thus input; an authentication system including the portable electronic device; and a method of controlling the portable electronic device.

BACKGROUND OF THE INVENTION

An authentication system includes: a portable electronic device (for example, a mobile telephone device), into which a passcode is input; and a reader for determining whether the passcode transmitted from the mobile telephone device coincides with a pre-registered passcode, and in a case in which the passcodes coincide with each other, a key provided to a door is unlocked.

In a mobile telephone device in an authentication system disclosed in Patent Document 1, communication with a reader is performed in advance, an identifying signal is transmitted to the reader, a response to the identifying signal thus transmitted is received from the reader, and subsequently, a user operates a key operation unit to input a passcode, and the passcode thus input is transmitted to the reader.

Moreover, in a mobile telephone device in an authentication system disclosed in Patent Document 2, transmission and reception of signals with a reader are repeated for transitioning to a mode for inputting a passcode. In the mobile telephone device that transitioned to such a mode, a passcode is input by a user operating a key operation unit, and identification (ID) information and the passcode thus input are transmitted to a reader. In this case, the passcode and the ID information transmitted from the mobile telephone device are cross-checked by the reader with a pre-registered passcode and ID information, respectively, and in a case in which both of them coincide with each other, a key is unlocked.

Patent Document 1: Japanese Unexamined Patent Application, Publication No. 2002-339608
Patent Document 2: Japanese Unexamined Patent Application, Publication No. 2001-193324

SUMMARY OF THE INVENTION

Problems to be Solved by the Invention

In the authentication system disclosed in Patent Documents 1 and 2, transmission and reception of signals are repeated between the mobile telephone device and an authentication unit, a passcode is subsequently input into the mobile telephone device, and the mobile telephone device transmits the passcode to the authentication unit; therefore, there is a problem of consuming time required for a passcode to be transmitted to the authentication unit.

An object of the present invention is to provide a portable electronic device, an authentication system, and a method of controlling the portable electronic device, all of which make it possible to shorten the time required for a passcode to be transmitted.

Means for Solving the Problems

A portable electronic device of the present invention is characterized by including: a first communication unit for performing communication; a key operation unit including a plurality of first keys, to which numeric characters are assigned, respectively; a display unit for displaying a numeric character when at least one of the plurality of first keys is operated, the numeric character being assigned to the first key thus operated; and a control unit for controlling the display unit to display characters when any of the first keys is operated in a state where a standard screen is displayed on the display unit, the characters corresponding to the first key thus operated, in which, in a case in which the first communication unit receives a passcode request signal in a state where the numeric character corresponding to the first key thus operated is displayed, the control unit controls the first communication unit to transmit a character string displayed on the display unit to a unit that transmitted the passcode request signal.

It is preferable for a numeric character and a non-numeric character to be assigned as the character to each of the plurality of first keys included in the key operation unit; each time at least one of the plurality of first keys is operated, it is preferable for the display unit to display both of a numeric character and a non-numeric character assigned to the first key thus operated; and in a case in which the first communication unit receives the passcode request signal in a state where both of a numeric character string and a non-numeric character string are displayed on the display unit as a result of operating the first keys, it is preferable for the control unit to control the first communication unit to transmit the numeric character string, from among the numeric character string and the non-numeric character string displayed on the display unit, to a unit that transmitted the passcode request signal.

In a state where both of a numeric character and a non-numeric character are displayed on the display unit as a result of operating any of the first keys, in a case in which the non-numeric character is converted into another non-numeric character, it is preferable for the control unit to control the display unit to cancel the displaying of the numeric character, and to display only the non-numeric character.

In a state where both of a numeric character and a non-numeric character are displayed on the display unit as a result of operating any of the first keys, in a case in which the non-numeric character is determined by operating a second key different from the plurality of first keys, it is preferable for the control unit to control the display unit to cancel the displaying of the numeric character, and to display only the non-numeric character.

In a case in which the first communication unit receives a response signal in response to transmitting the character string to the unit that transmitted the passcode request signal, it is preferable for the control unit to control the display unit to display information based on the response signal.

It is preferable for the operation unit to further include a third key, to which the character is not assigned, but an outgoing telephone call function is assigned; and in a case in which the third key is operated in a state where numeric characters are displayed on the display unit, it is preferable for the control unit to perform control regarding an outgoing telephone call to a telephone number using the numeric characters displayed on the display unit.

It is preferable for the portable electronic device to further include a second communication unit capable of connecting to a public communication network, in which it is preferable for the plurality of first keys to be numeric keys, with which a telephone number can be input for making an outgoing call by way of the second communication unit.

In a state where the character is displayed on the display unit as a result of operating any of the first keys in a state where the standard screen is displayed on the display unit, in a case in which the first communication unit receives a signal, and the signal thus received is not a passcode request signal, it is preferable for the control unit to control the first communication unit to perform data communication without using a character string displayed on the display unit.

It is preferable for the first communication unit to be a magnetic field communication unit for performing magnetic field communication; and in a state where a numeric character is displayed on the display unit as a result of operating any of the first keys, when the magnetic field communication unit receives a signal, it is preferable for the control unit to determine whether the signal thus received is a passcode request signal, and in a case in which the signal is not a passcode request signal, it is preferable for the magnetic field communication unit to not execute transmission processing regarding a character string displayed on the display unit.

An authentication system of the present invention is characterized by including a portable electronic device and a reader for communicating with the portable electronic device, in which the portable electronic device includes: a communication unit; a key operation unit including a plurality of first keys, to which characters are assigned, respectively; a display unit for displaying a character when at least one of the plurality of first keys is operated, the character being assigned to the first key thus operated; and a control unit, in which, in a case in which any of the first keys is operated in a state where a standard screen is displayed on the display unit, the control unit controls the display unit to display a character corresponding to the first key thus operated, and in a case in which the communication unit receives a passcode request signal from the reader in a state where a numeric character corresponding to the first key thus operated is displayed, the control unit controls the communication unit to transmit a character string displayed on the display unit to the reader; and the reader includes: a communication unit for receiving the character string from the portable electronic device in response to the passcode request signal, after transmitting the passcode request signal to the portable electronic device; a storage unit for storing a passcode for granting authentication; and a control unit for performing control to execute processing related to authentication, in a case in which a character string received by the reader coincides with the passcode stored in the storage unit.

A method of the present invention is a method of controlling a portable electronic device including: a plurality of first keys to which numeric characters are assigned, respectively; and a display unit, and the method is characterized by performing the steps of: displaying a standard screen on the display unit; displaying a character on the display unit when at least one of the plurality of first keys is operated, the character being assigned to the first key thus operated; and transmitting a character string to an external device that transmitted a passcode request signal, in a case in which a signal being the passcode request signal is received from the external device in a state where the character string is displayed.

Effects of the Invention

According to the present invention, it is possible to shorten the time required for a passcode to be transmitted.

BRIEF DESCRIPTION OF THE DRAWINGS

FIG. 4 is a diagram for illustrating how a manner of displaying on a display unit changes when an editor application is activated;

FIG. 8 is a diagram for illustrating operations of the authentication system.

DETAILED DESCRIPTION OF THE INVENTION

Portable Electronic Device

Figure 1:
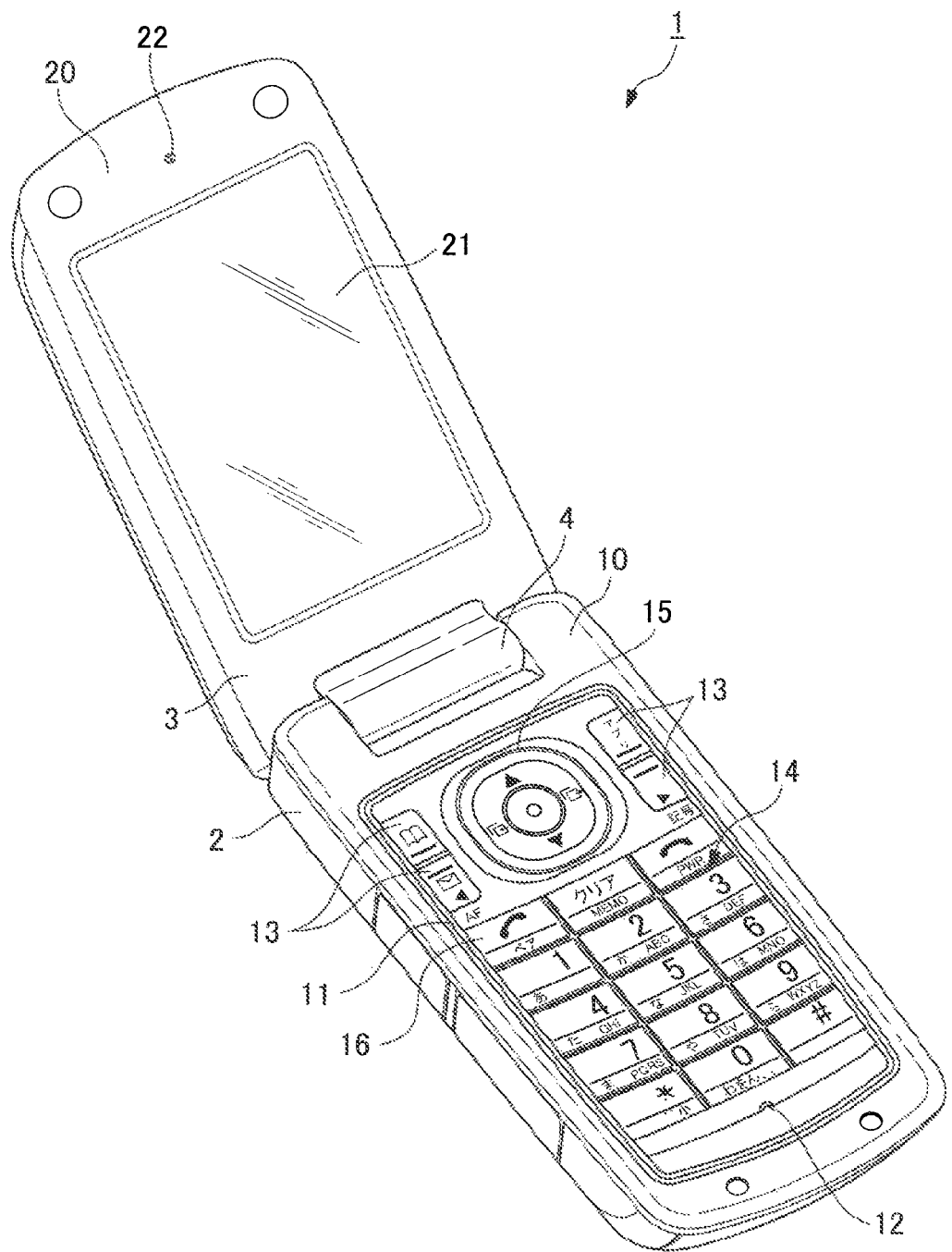
FIG. 1 is a perspective view showing an appearance of a mobile telephone device according to an embodiment of a portable electronic device of the present invention.

Descriptions are provided hereinafter for an embodiment of the present invention. FIG. 1 is a perspective view showing an appearance of a mobile telephone device 1 according to an embodiment of a portable electronic device of the present invention. It should be noted that, although FIG. 1 shows what is called a folding-type mobile telephone device, the mobile telephone device according to the present invention is not particularly limited thereto. For example, the type of the mobile telephone device may be a slider type in which one of the bodies slides to one direction in a state where the bodies are mutually superimposed; a rotating (turning) type in which one of the bodies is rotated around an axis line along the direction of superimposing the bodies; and a type (straight type or flip type) in which an operation unit and a display unit are disposed in one body without having a connecting portion.

The mobile telephone device 1 includes an operation unit side body 2 and a display unit side body 3. The operation unit side body 2 includes, on a front face 10 thereof, an operation unit 11 (a key operation unit) and a microphone 12 to which sound produced by a user of the mobile telephone device 1 during a phone call is input. The operation unit 11 includes: function setting operation keys 13 for operating various functions such as for various settings, a telephone number directory function and a mail function; input operation keys 14 for inputting the digits of a telephone number and characters for mail, etc.; and a selection operation key 15 for performing selection of the various operations, scrolling, etc. Such keys may be disposed (displayed) on a touch panel that is formed integrally with a display unit 21.

The display unit side body 3 includes, on a front face 20, the display unit 21 for displaying a variety of information, and a speaker 22 for outputting sound of the other party during a telephone call.

An upper end portion of the operation unit side body 2 and a lower end portion of the display unit side body 3 are connected via a hinge mechanism 4. The mobile telephone device 1 can be in a state where the operation unit side body 2 and the display unit side body 3 are apart from each other (opened state), and in a state where the operation unit side body 2 and the display unit side body 3 are contacting each other (folded state), as the operation unit side body 2 and the display unit side body 3, connected via the hinge mechanism 4, pivot with respect to each other.

Figure 2:
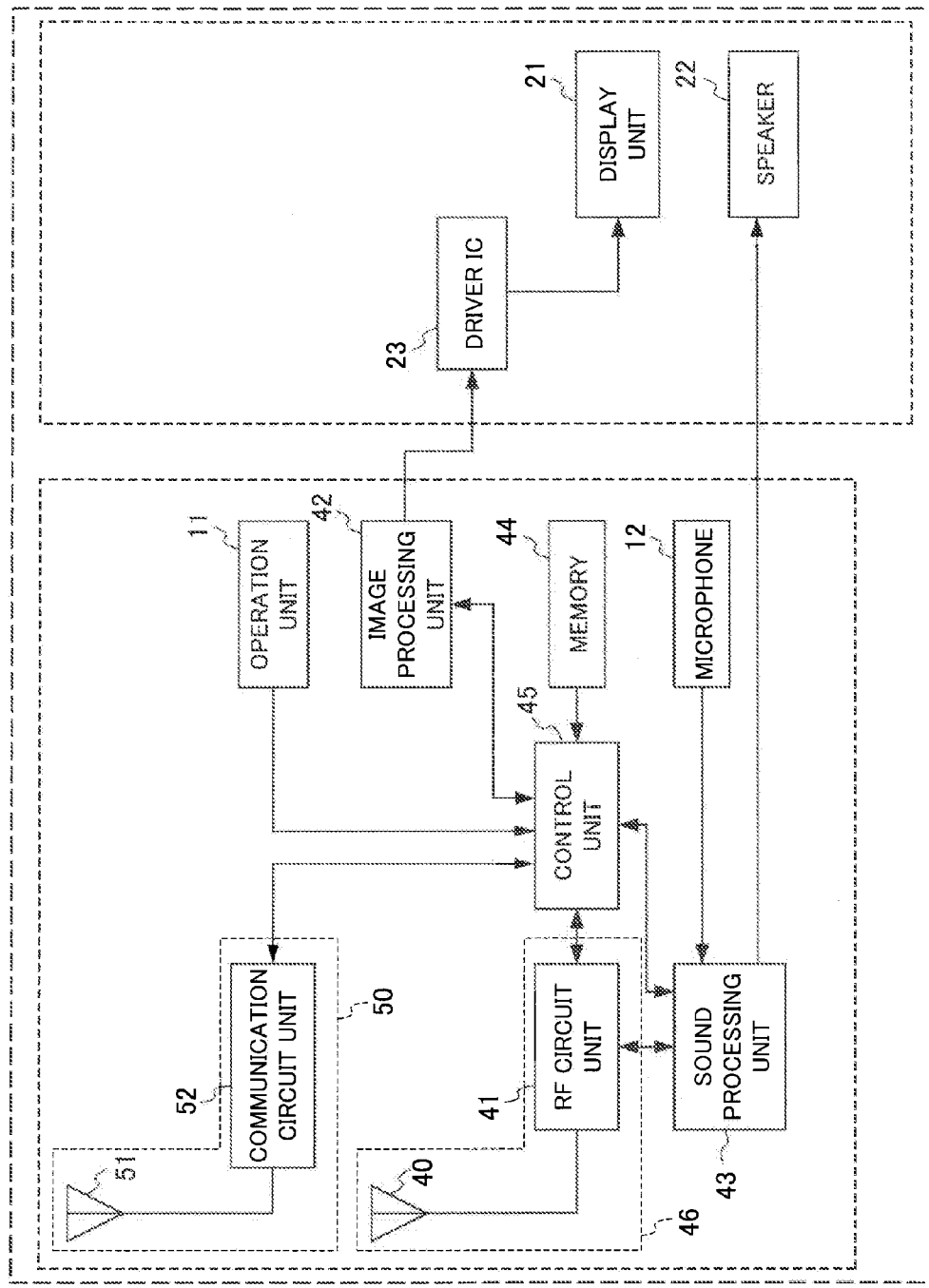
FIG. 2 is a functional block diagram showing functions of the mobile telephone device.

FIG. 2 is a functional block diagram showing functions of the mobile telephone device 1. As shown in FIG. 2, in the mobile telephone device 1, the operation unit side body 2 or the display unit side body 3 includes the operation unit 11, the microphone 12, a first communication unit 50, a second communication unit 46, an image processing unit 42, a sound processing unit 43, memory 44, a control unit 45, the display unit 21, the speaker 22 and a driver IC 23. The first communication unit 50 will be described later in detail.

The second communication unit 46 includes a main antenna 40 and an RF circuit unit 41.

The main antenna 40 is configured to communicate with external devices by connecting to a public communication network through a base station in a predetermined usable frequency band (for example, 800 MHz band). Although 800 MHz is set as the predetermined usable frequency band in the present embodiment, other frequency bands can also be used.

The RF circuit unit 41 executes demodulation processing on a signal received via the main antenna 40, and transmits the processed signal to the control unit 45. The RF circuit unit 41 executes modulation processing on the signal transmitted from the control unit 45, and transmits the signal to external devices via the main antenna 40. On the other hand, the RF circuit unit 41 notifies the control unit 45 of the intensity of a signal received via the main antenna 40.

The image processing unit 42 executes predetermined image processing, and outputs the processed image data to the driver IC 23, in accordance with control by the control unit 45. When the image data is transmitted from the image processing unit 42, the driver IC 23 stores the image data in frame memory, and outputs the image data on the display unit 21 at predetermined timing.

The sound processing unit 43 executes predetermined sound processing in accordance with control by the control unit 45 for a signal transmitted from the RF circuit unit 41, and outputs the processed signal to the speaker 22. The speaker 22 externally outputs the signal that is transmitted from the sound processing unit 43.

When a signal is input from the microphone 12, the sound processing unit 43 processes the signal, and outputs the processed signal to the RF circuit unit 41, in accordance with control by the control unit 45. The RF circuit unit 41 executes predetermined processing on the signal transmitted from the sound processing unit 43, and outputs the processed signal to the main antenna 40.

The memory 44 includes, for example, working memory, and is utilized for arithmetic processing by the control unit 45. The memory 44 stores a plurality of applications as well as various tables and the like that are required by the applications. The memory 44 may also serve as removable external memory.

The control unit 45 controls the entirety of the mobile telephone device 1, and is configured to employ a central processing unit (CPU) and the like. Here, descriptions are provided for control operations of the control unit 45 depending on key operations via the operation unit 11. The control unit 45 changes non-numeric characters, numeric characters, symbols and functions to be assigned to each key (the function setting operation keys 13, the input operation keys 14 and the selection key 15) configuring the operation unit 11, essentially in accordance with an application that is currently activated.

Figures 3A, 3B, 3C:
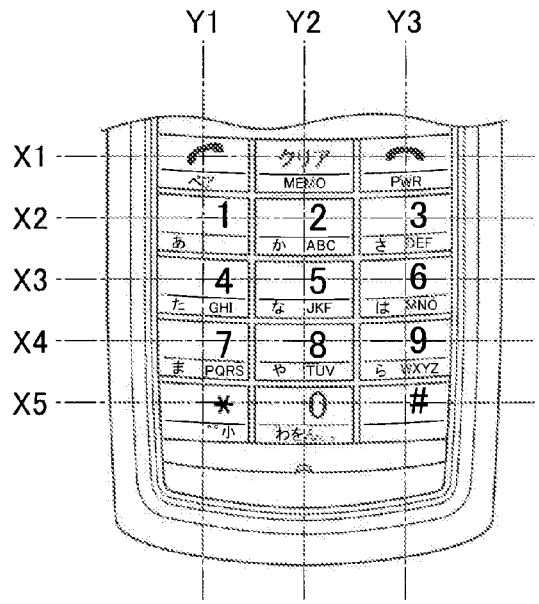
FIG. 3 is a diagram for illustrating key assignment.

More specifically, when any key is operated, the operation unit 11 transmits position information of the key (for example, as shown in FIG. 3A, in a case in which a key (a key with "1" and "a" printed on its surface) in the second line and the left row among the input operation keys 14 is operated, position information (X2, Y1) is transmitted) to the control unit 45. The control unit 45 accesses the memory 44, refers to a key assignment table corresponding to an application that is currently activated, and executes processing of a character assigned thereto, based on the position information that has been transmitted from the operation unit 11. For example, as shown in FIGS. 3B and 3C, the memory 44 stores a plurality of key assignment tables. FIG. 3B is a table that is utilized when an outgoing telephone call is made, and FIG. 3C is a table that is utilized in a memo pad application and a mail application.

Execution of processing of a character means that, for example, in a case in which the currently activated application is a memo pad, "1" or "a" is displayed on the display unit 21.

The memory 44 stores the plurality of key assignment tables, and depending on the application, the control unit 45 switches a key assignment table to be referred to, refers to a predetermined key assignment table based on position information of a key that has been transmitted from the operation unit 11, and executes predetermined processing.

Next, descriptions are provided for an editor application that is utilized in the mobile telephone device 1. FIG. 4 is a diagram for illustrating how a manner of displaying on the display unit 21 changes when the editor application is activated.

In a state where the display unit 21 displays a standard screen 100 (see FIG. 4A) (i.e. a screen that is displayed while waiting for communication, and while waiting for activation of an application; and the standard screen is also referred to as a wallpaper screen or a desktop screen), in a case in which any key composing the input operation keys 14 is operated, the control unit 45 controls the display unit 21 to display both of a non-numeric character string display area 101 for displaying a non-numeric character assigned to the operated key, and a numeric character string display area 102 for displaying a numeric character assigned to the operated key, in place of the standard screen 100 (see FIG. 4B).

Here, as illustrated in FIG. 4, in a state where the standard screen 100 is displayed on the display unit 21 (see FIG. 4A), in a case in which a key with a numeric character "0" and hiragana characters "wa wo n" printed on its surface is operated, the control unit 45 performs control such that "wa" is displayed in the non-numeric character string display area 101, and "0" is displayed in the numeric character string display area 102 (see FIG. 4B). In a case in which keys composing the input operation keys 14 are consecutively operated a plurality of times, a hiragana character string "wa ta na be" is displayed in the non-numeric character string display area 101, and a numeric character string "0456666*" is displayed in the numeric character string display area 102 (see FIG. 4C).

In a case in which a calling key 16 (a third key; see FIG. 1) is operated in a state where the non-numeric character string display area 101 and the numeric character string display area 102 are displayed on the display unit 21 (see FIGS. 4B and 4C), the control unit 45 performs control regarding an outgoing telephone call to a telephone number using the numeric character string displayed in the numeric character string display area 102 as the telephone number.

Subsequently, in a case in which the selection key 15 is vertically operated, the control unit 45 executes processing for converting the hiragana character string displayed in the non-numeric character string display area 101 into a kanji character string, and processing for displaying the non-numeric character string display area 101 over the entirety of the displayed unit 21 (the display screen) (see FIG. 4D).

The mobile telephone device 1 as thus constituted has a function capable of shortening the time required for a numeric character string to be transmitted.

Descriptions are hereinafter provided for a configuration and operations for achieving the aforementioned function according to the mobile telephone device 1. First of all, with reference to FIG. 2, descriptions are provided for the configuration for achieving the aforementioned function of the mobile telephone device 1 according to the present embodiment.

The first communication unit 50 includes an antenna 51 and a communication circuit unit 52, and communicates with external devices (for example, a reader to be described below). Functions of the first communication unit 50 will be described later in detail.

The operation unit 11 includes the plurality of input operation keys 14 (first keys), to which numeric characters are assigned, respectively.

When at least one of the plurality of input operation keys 14 is operated, the display unit 21 displays a numeric character assigned to the input operation key 14 thus operated. The display unit 21 displays the standard screen 100.

In a state where a numeric character string is displayed on the display unit 21 as a result of operating any of the input operation keys 14 in a state where the standard screen 100 is displayed on the display unit 21, in a case in which the first communication unit 50 receives a signal, and the signal thus received is a passcode request signal, the control unit 45 controls the first communication unit 50 to transmit the numeric character string displayed on the display unit 21 to the unit that transmitted the passcode request.

In a case in which any key composing the input operation keys 14 is operated in a state where the standard screen 100 is displayed on the display unit 21, the control unit 45 activates the editor application. In a case in which the editor application is activated, the control unit 45 controls the editor application to input a numeric character assigned to the input operation key 14 thus operated. The control unit 45 controls the display unit 21 to display the numeric character string display area 102, such that the numeric character assigned to the input operation key 14 thus operated is input into the numeric character string display area 102. In a case in which the input operation keys 14 are operated a plurality of times, the control unit 45 performs control such that the numeric characters assigned to the input operation keys 14 thus operated are sequentially input into the numeric character string display area 102. As a result, a numeric character string is displayed in the numeric character string display area 102.

In a case in which the first communication unit 50 receives a passcode request signal, the control unit 45 transmits the numeric character string, which is input into the numeric character string display area 102, to the unit that transmitted the passcode request signal.

Figure 5:
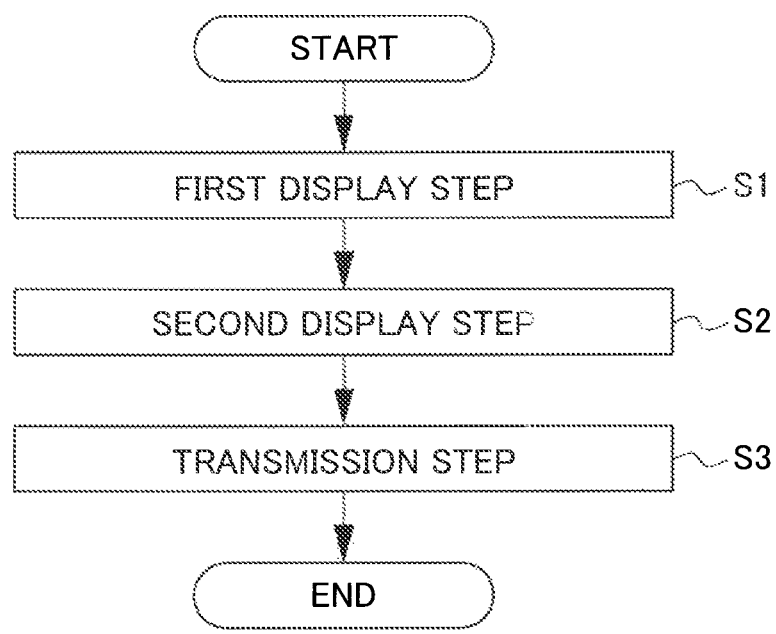
FIG. 5 is a functional block diagram showing a configuration for the mobile telephone device to achieve functions.

Next, descriptions are provided for a method of controlling the mobile telephone device 1 thus constituted. FIG. 5 is a flow chart for illustrating the method of controlling the mobile telephone device 1.

The mobile telephone device 1 performs a first display step S1, a second display step S2, and a transmission step S3.

In the first display step S1, the display unit 21 displays the standard screen 100.

In the second display step S2, when at least one of the plurality of input operation keys 14 is operated in a state where the standard screen 100 is displayed, the display unit 21 displays a numeric character assigned to the input operation key 14 thus operated. In a case in which the input operation keys 14 are operated a plurality of times, the display unit 21 displays a numeric character string.

In the transmission step S3, in a state where a numeric character string is displayed, when a signal is received from an external device, in a case in which the signal is a passcode request signal, the control unit 45 performs control such that the numeric character string thus displayed is transmitted to the unit that transmitted the passcode request signal.

Therefore, in a case in which the first communication unit 50 receives a passcode request signal in a state where a numeric character string is displayed on the display unit 21, the mobile telephone device 1 transmits the numeric character string displayed on the display unit 21; therefore, unlike conventional cases, it is not necessary to input the numeric character string after receiving the passcode request signal, and it is possible to shorten the time required for the numeric character string to be transmitted. A configuration may be employed such that, in a case in which a passcode request signal is received in a state where a numeric character string is not displayed, the display unit 21 displays a screen for prompting an input of a passcode, and a numeric character string thus input is subsequently transmitted as the passcode.

Non-numeric characters may be further assigned to the plurality of input operation keys 14 included in the operation unit 11. In this case, when at least one of the plurality of input operation keys 14 is operated, the display unit 21 displays both of a numeric character and a non-numeric character assigned to the input operation key 14 thus operated. In a case in which a passcode request signal is received in this state, a numeric character string is transmitted instead of a non-numeric character string.

In a case in which the first communication unit 50 receives a passcode request signal in a state where both of a numeric character string and a non-numeric character string are displayed on the display unit 21 as a result of operating any of the input operation keys 14, the control unit 45 controls the first communication unit 50 to transmit the numeric character string, from among the numeric character string and the non-numeric character string displayed on the display unit 21, to the unit that transmitted the passcode request signal.

In a case in which any key composing the input operation keys 14 is operated in a state where the standard screen 100 is displayed on the display unit 21, the control unit 45 activates the editor application.

In a case in which the editor application is activated, the control unit 45 controls the editor application to input a numeric character and a non-numeric character assigned to the input operation key 14 thus operated. The control unit 45 controls the display unit 21 to display the numeric character string display area 102 and the non-numeric character string display area 101, such that the numeric character assigned to the input operation key 14 thus operated is input into the numeric character string display area 102, and the non-numeric character assigned to the input operation key 14 thus operated is input into the non-numeric character string display area 101.

In a case in which the input operation keys 14 are operated a plurality of times, the control unit 45 performs control such that the numeric characters and the non-numeric characters assigned to the input operation keys 14 thus operated are input into the numeric character string display area 102 and the non-numeric character string display area 101, respectively. As a result, a numeric character string is displayed in the numeric character string display area 102. A non-numeric character string is displayed in the non-numeric character string display area 101.

In a case in which the first communication unit 50 receives a passcode request signal, the control unit 45 transmits the numeric character string, which is input into the numeric character string display area 102, to the unit that transmitted the passcode request signal.

Here, in the mobile telephone device 1, in a case in which a non-numeric character string (for example, a hiragana character string "ko n ni chi wa (hello in English)", see FIG. 8B) is input into the editor application by operating the input operation keys 14, a numeric character string (for example, "2222200055446", see FIG. 8B), which corresponds to the input operation keys 14 operated when the non-numeric character string is generated, is also input into the editor application. In other words, the non-numeric character string and the numeric character string corresponding to the non-numeric character string are input into the editor application. Therefore, even in a case in which a non-numeric character string memorized by the user is input into the editor application, the mobile telephone device 1 can transmit a numeric character string, based on the numeric characters assigned to the input operation keys 14 that were operated when the non-numeric character string was input. Thus, the user of the mobile telephone device 1 may memorize a non-numeric character string that is easy to be memorized, instead of memorizing a numeric character string that is hard to be memorized.

Therefore, in a case in which the first communication unit 50 receives a passcode request signal in a state where a numeric character string is displayed on the display unit 21, the mobile telephone device 1 transmits the numeric character string displayed on the display unit 21; therefore, unlike conventional cases, it is not necessary to input the numeric character string after receiving the passcode request signal, and it is possible to shorten the time required for the numeric character string to be transmitted.

In a state where both of numeric characters and non-numeric characters are displayed on the display unit 21 as a result of operating any of the input operation keys 14, in a case in which the non-numeric characters thus displayed are converted into other non-numeric characters (conversion processing), or in a case in which the non-numeric characters thus displayed are determined (determination processing) by operating the selection key 15 (a second key) different from the plurality of input operation keys 14, it is preferable for the control unit 45 to control the display unit 21 not to display the numeric characters but to display only the non-numeric characters.

In a case in which the conversion processing or the determination processing is executed, the control unit 45 controls the display unit 21 to display the non-numeric character string display area 101 over the entirety of display unit 21 (the display screen) (see FIG. 4D). In other words, in a case in which the conversion processing or the determination processing is executed, the control unit 45 controls the display unit 21 not to display the numeric character string display area 102.

Therefore, since only the non-numeric character string display area 101 is displayed on the display unit 21 in a case in which the conversion processing or the determination processing is executed, the user of the mobile telephone device 1 can continue to use the editor application without transmitting the numeric character string.

In a case in which the first communication unit 50 receives a response signal in response to transmitting a numeric character string to the unit that transmitted the passcode request signal, it is preferable for the control unit 45 to control the display unit 21 to display information based on the response signal.

For example, in a case in which the unit that transmitted the signal is a reader for cross-checking a numeric character string transmitted from the mobile telephone device 1 with a pre-registered passcode, the information based on the response signal is a result of cross-checking the numeric character string with the passcode. As more specific examples, the information based on the response signal may be information such as "the passcode is authenticated" or "please transmit a numeric character string again".

Therefore, since the display unit 21 displays information based on a response signal, the mobile telephone device 1 can inform the user of a result of processing by the unit that processed the numeric character string transmitted thereto. Thus, in a case in which the numeric character string is required to be transmitted again, the user can transmit the numeric character string again.

It is preferable for the operation unit 11 to further include the calling key 16 (the third key), to which a non-numeric character and a numeric character are not assigned, but an outgoing telephone call function is assigned. In this case, in a case in which the calling key 16 is operated in a state where numeric characters are displayed on the display unit 21, the control unit 45 performs control regarding an outgoing telephone call to a telephone number using the numeric characters displayed on the display unit 21.

In other words, in a case in which the calling key 16 is operated in a state where the non-numeric character string display area 101 and the numeric character string display area 102 are displayed on the display unit 21 (see FIGS. 4B and 4C), the control unit 45 performs control regarding an outgoing telephone call to a telephone number using the numeric character string displayed in the numeric character string display area 102 as the telephone number.

Therefore, in a case in which the calling key 16 is operated while the editor application is in use, the mobile telephone device 1 can make an outgoing telephone call.

It is preferable for the mobile telephone device 1 to further include the second communication unit 46 capable of connecting to a public communication network. In this case, the plurality of input operation keys 14 are numeric keys, with which a telephone number can be input for making an outgoing call by way of the second communication unit 46.

Therefore, without providing special input operation keys, the present invention can be employed in the mobile telephone device 1 that includes the input operation keys 14 for inputting a telephone number.

In a state where a numeric character string is displayed on the display unit 21 as a result of operating any of the input operation keys 14 in a state where the standard screen 100 is displayed on the display unit 21, in a case in which the first communication unit 50 receives a signal, and the signal thus received is not a passcode request signal, it is preferable for the control unit 45 to control the first communication unit 50 to perform data communication without using the numeric character string displayed on the display unit 21.

The data to be transmitted to the unit that transmitted the signal is stored in, for example, the memory 44, an integrated circuit (IC) chip (memory) (not shown) included in the first communication unit 50, or the like. The data may be, for example, various kinds of information such as a commutation ticket for transportation, electronic money, or an employee ID card.

Therefore, since the mobile telephone device 1 transmits data to the unit that transmitted the signal in a case in which a received signal is not a passcode request signal, the mobile telephone device 1 can be utilized like an IC card.

The first communication unit 50 may be a magnetic field communication unit for performing magnetic field communication. In this case, in a state where a numeric character string is displayed on the display unit 21 as a result of operating any of the input operation keys 14, when the magnetic field communication unit receives a signal, the control unit 45 determines whether the signal thus received is a passcode request signal, and in a case in which the signal is not a passcode request signal, the magnetic field communication unit does not execute transmission processing regarding the numeric character string displayed on the display unit 21. In other words, for example, in a case in which the signal is for requesting payment of electronic money, processing for charging the electronic money or the like is executed.

Here, an example of the magnetic field communication is illustrated. The unit (here, the reader) that transmits a signal supplies an electric current to its antenna (not shown) to generate a magnetic field around the antenna. In a case in which the mobile telephone device 1 is brought close to the magnetic field, an induced electromotive force is generated in the antenna 51 of the first communication unit 50 due to the magnetic field. The induced electromotive force is supplied to the communication circuit unit 52. In a case in which the reader modulates the electric current to be supplied to its antenna, the induced electromotive force is modulated. Therefore, by modulating the electric current to be supplied to its antenna, the reader transmits a signal (data) to the mobile telephone device 1.

On the other hand, in a case in which the load on the antenna 51 of the first communication unit 50 fluctuates, the impedance of the antenna of the reader fluctuates, and the electric power that passes the antenna of the reader fluctuates. Therefore, the reader receives a signal (data) from the mobile telephone device 1 by detecting (demodulating) such fluctuation of the electric power.

In a case in which a signal is received through the magnetic field communication, and the signal is not a passcode request signal, the control unit 45 does not execute processing for transmitting the numeric character string, which was input into the editor application, to the reader.

Therefore, since a numeric character string is transmitted only in a case in which the magnetic field communication unit receives a passcode request signal, the mobile telephone device 1 can transmit the numeric character string to only a particular unit, and the security can be secured.

Authentication System

Figure 6:
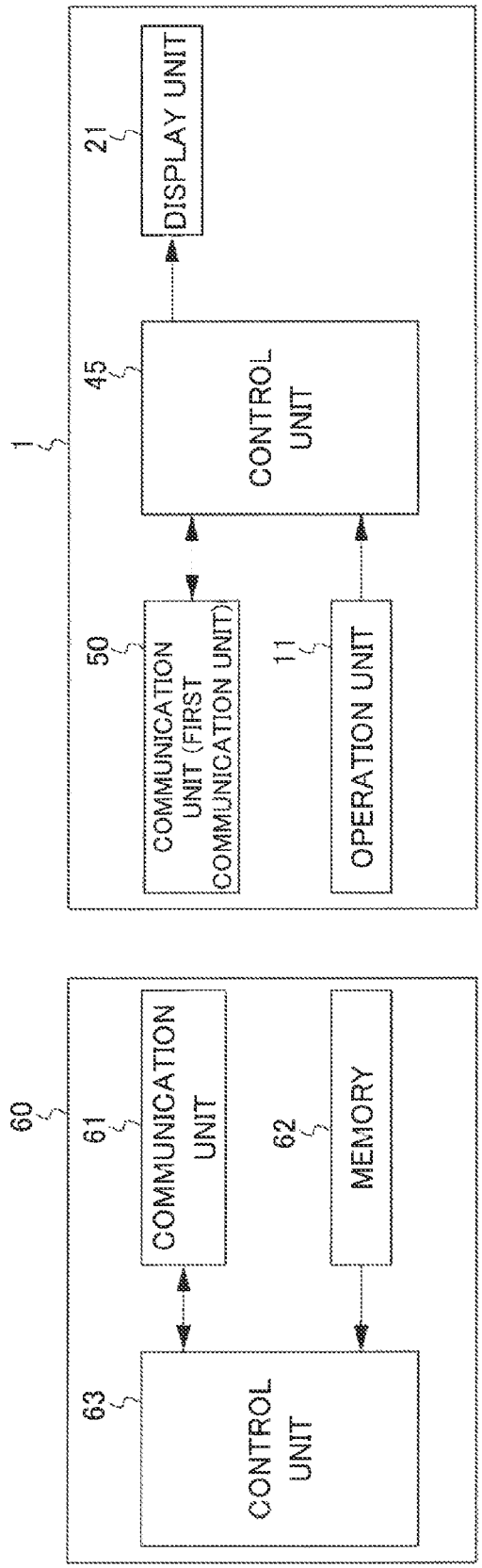
FIG. 6 is a functional block diagram showing functions of an authentication system.

FIG. 6 is a functional block diagram showing functions of an authentication system.

The authentication system includes the mobile telephone device 1 (a portable electronic device) and the reader 60 that communicates with the mobile telephone device 1.

The mobile telephone device 1 includes the first communication unit 50 (a communication unit), the operation unit 11 (the key operation unit), the display unit 21, and the control unit 45.

The operation unit 11 includes the plurality of input operation keys 14, to which numeric characters are assigned, respectively.

When at least one of the plurality of input operation keys 14 is operated, the display unit 21 displays a numeric character assigned to the input operation key 14 thus operated.

In a state where a numeric character string is displayed on the display unit 21 as a result of operating any of the input operation keys 14 in a state where the standard screen 100 is displayed on the display unit 21, in a case in which the first communication unit 50 receives a passcode request signal from the reader 50, the control unit 45 controls the first communication unit 50 to transmit the numeric character string displayed on the display unit 21 to the reader 60.

A specific configuration of the mobile telephone device 1 in the authentication system is the same as the configuration of the mobile telephone device 1 described above in Section "Portable Electronic Device". Accordingly, detailed descriptions regarding the mobile telephone device 1 are omitted.

The reader 60 includes a communication unit 61, memory 62 (a storage unit), and a control unit 63.

After the communication unit 61 transmits a passcode request signal to the mobile telephone device 1, the communication unit 61 receives a numeric character string from the mobile telephone device 1 in response to the passcode request signal.

The memory 62 stores a passcode for granting authentication.

In a case in which the numeric character string received by the reader 60 coincides with the passcode stored in the memory 62, the control unit 63 performs control for executing processing related to authentication. For example, in a case in which the reader 60 is provided to a device for locking and unlocking a key (for example, a locking side system to be described below), the processing related to authentication is processing for unlocking the key.

The reader 60 (for example, the locking side system to be described below) is connected to a public power supply, and the communication unit 61 thereof generates a magnetic field for magnetic field communication. When the mobile telephone device 1 or an IC card enters the magnetic field, an induced electromotive force is generated in a magnetic field antenna of the mobile telephone device 1 or the IC card, due to the magnetic field. By detecting generation of such the electromotive force, each control unit of the mobile telephone device 1 or the IC card can recognize the fact that the mobile telephone device 1 or the IC card can perform magnetic field communication.

Accordingly, in a case in which the first communication unit 50 receives a passcode request signal in a state where a numeric character string is displayed on the display unit 21 of the mobile telephone device 1, the numeric character string displayed on the display unit 21 is transmitted to the reader 60, and the authentication system determines whether the numeric character string coincides with the passcode in the reader 60; therefore, unlike conventional cases, it is not necessary to input the numeric character string after the mobile telephone device 1 receives the passcode request signal, and it is possible to shorten the time required for the numeric character string to be transmitted to the reader 60.

Figure 7:
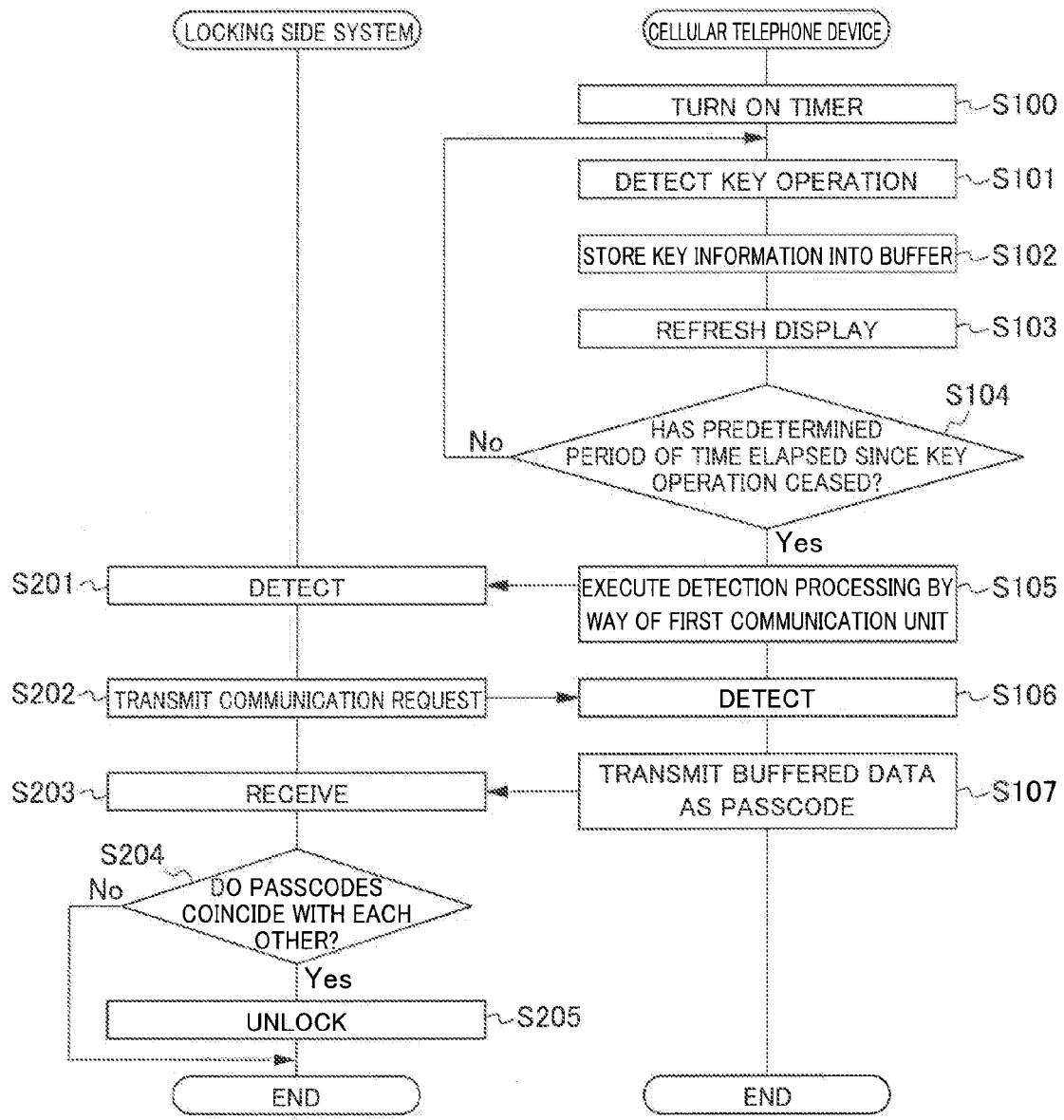
FIG. 7 is a first sequence chart for illustrating operations of the authentication system.

Next, descriptions are provided for first operations of the authentication system (for example, in a case in which a key provided to a door is unlocked by utilizing the mobile telephone device 1). FIG. 7 is a first sequence chart for illustrating operations of the authentication system.

First, descriptions are provided for operations of the mobile telephone device 1.

In Step S100, in a case in which the standard screen 100 is displayed on the display unit 21, the control unit 45 activates a timer (not shown).

In Step S101, the control unit 45 determines whether any of the input operation keys 14 is operated.

In Step S102, the control unit 45 stores information of the key, which was detected in the processing in Step S101, into a buffer. In other words, the control unit 45 stores a numeric character assigned to the input operation key 14 thus operated into the memory 44.

In Step S103, the control unit 45 refreshes the displaying of the display unit 21. In other words, the control unit 45 controls the display unit 21 to display the numeric character assigned to the input operation key 14 thus operated.

In Step S104, the control unit 45 determines whether a predetermined period of time has elapsed since the operation of the input operation keys 14 ceased, according to the timing by the timer that was activated in the processing in Step S100. In a case in which the predetermined period of time has not elapsed (NO), the processing returns to Step S101. In a case in which the predetermined period of time has elapsed (YES), the processing advances to Step S105.

In Step S105, the control unit 45 executes detection processing by way of the first communication unit 50.

In Step S106, the control unit 45 detects a communication request that was transmitted from a locking side system (here, the reader 60) as processing in Step S202 to be described below.

In Step S107, the control unit 45 transmits key information (a numeric character string), which was stored in the buffer as the processing in Step S102, as a passcode to the locking side system.

Here, descriptions are provided for the operations of the mobile telephone device 1 and the reader 60, from a viewpoint of a processing flow between the mobile telephone device 1 and the reader 60 of the locking side system.

When an induced electromotive force is generated due to a magnetic force that is acquired via the antenna 51 (a loop-type magnetic field antenna), the first communication unit 50 notifies the control unit 45 of information that the induced electromotive force is generated. As a result, the control unit 45 detects the information that the induced electromotive force is generated, i.e. the information that the device itself is within a range in which communication with the reader 60 is possible (Step S105). Here, the first communication unit 50 responds to the reader 60 with information that communication is possible.

On the other hand, upon receiving the information that communication is possible (Step S201 to be described below), the reader 60 successively outputs a communication request signal (Step S202 to be described below). Here, since the reader 60 is a device related to the locking side system, a type of a request signal to be transmitted from the reader 60 is a passcode request signal.

The first communication unit 50 receives a passcode request signal (Step S106), and the control unit 45 recognizes the fact that the communication partner is a locking side system, and that a passcode is required to be transmitted. In a case in which the device itself is currently in a standby state, and a numeric character string is stored in the buffer of the memory 44, the control unit 45 controls the first communication unit 50 to transmit the numeric character string as a passcode to the reader 60.

In a case in which the reader 60 side receives the numeric character string as the passcode in response to the passcode request signal (Step S203 to be described below), the processing advances to Step S204 to be described below.

Next, descriptions are provided for operations of the locking side system.

In Step S201, the reader 60 of the locking side system detects the signal that was transmitted from the mobile telephone device 1 as the processing in Step S105.

In Step S202, the reader 60 transmits a communication request to the mobile telephone device 1. In other words, the reader 60 transmits a passcode request signal to the mobile telephone device 1.

In Step S203, the reader 60 receives the numeric character string (the passcode) that was transmitted as the processing in Step S107.

In Step S204, the reader 60 determines whether the numeric character string received as the processing in Step S203 coincides with a passcode stored beforehand in the memory 62. In a case in which the numeric character string does not coincide with the passcode (NO), the processing is terminated. In a case in which the numeric character string coincides with the passcode (YES), the processing advances to Step S205.

In Step S205, the locking side system unlocks the key provided to the door.

Figure 9:
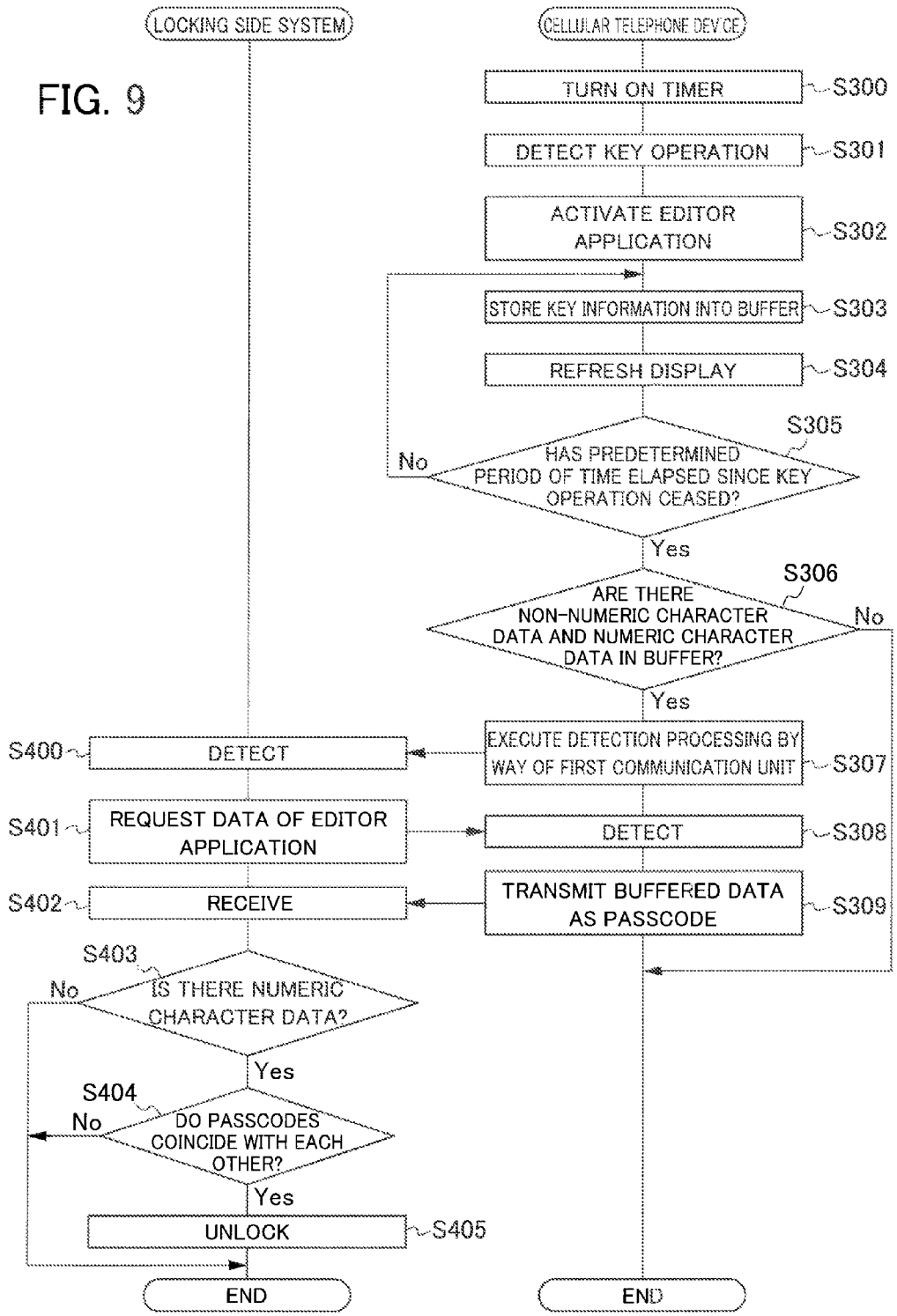
FIG. 9 is a second sequence chart for illustrating operations of the authentication system.

Next, descriptions are provided for second operations of the authentication system (for example, in a case in which a key provided to a door is unlocked by utilizing the mobile telephone device 1). FIG. 8 is a diagram for illustrating operations of the authentication system. FIG. 9 is a second sequence chart for illustrating operations of the authentication system.

First, descriptions are provided for operations of the mobile telephone device 1.

The display unit 21 of the mobile telephone device 1 displays the standard screen 100 (see FIG. 8A).

Next, in Step S300 shown in FIG. 9, in a state where the standard screen 100 is displayed on the display unit 21, the control unit 45 activates the timer (not shown).

In Step S301, the control unit 45 determines whether any of the input operation keys 14 is operated.

In Step S302, the control unit 45 activates the editor application. Furthermore, the control unit 45 controls the activated editor application to input a numeric character and a non-numeric character assigned to the input operation key 14 thus operated.

In Step S303, the control unit 45 stores information of a key, which was detected in the processing in Step S301, into the buffer. In other words, the control unit 45 stores the numeric character assigned to the input operation key 14 thus operated into the memory 44.

In Step S304, the control unit 45 refreshes the displaying of the display unit 21. In other words, the control unit 45 controls the display unit 21 to display the numeric character string display area 102 and the non-numeric character string display area 101. The control unit 45 performs control such that the numeric character assigned to the input operation key 14 thus operated is input into the numeric character string display area 102, and the non-numeric character assigned to the input operation key 14 thus operated is input into the non-numeric character string display area 101.

For example, as a result of operating any of the input operation keys 14, the control unit 45 performs control such that a hiragana character string "ko n ni chi wa (hello in English)" as a non-numeric character string is input into the non-numeric character string display area 101, and the hiragana character string "ko n ni chi wa", a kanji/hiragana character string "ko n ni chi wa", and a katakana character string "ko n ni chi wa" as predictive conversion candidates for the hiragana character string "ko n ni chi wa" are displayed in the non-numeric character string display area 101 (see FIG. 8B). The control unit 45 performs control such that a numeric character string "2222200055446", which is based on numeric characters assigned to the input operation keys 14 operated for inputting the non-numeric character string "ko n ni chi wa" into the editor application, is displayed in the numeric character string display area 102 (see FIG. 8B).

In Step S305, the control unit 45 determines whether a predetermined period of time has elapsed since the operation of the input operation keys 14 ceased, according to the timing by the timer that was activated in the processing in Step S300. In a case in which the predetermined period of time has not elapsed (NO), the processing returns to Step S303. In a case in which the predetermined period of time has elapsed (YES), the processing advances to Step S306.

In Step S306, the control unit 45 determines whether non-numeric character data and numeric character data are stored in the buffer. In other words, the control unit 45 determines whether the key information that was stored in the memory 44 as the processing in Step S303 includes the non-numeric character data and the numeric character data. In a case in which the non-numeric character data and the numeric character data are stored in the buffer (YES), the processing advances to Step S307. In a case in which the non-numeric character data and the numeric character data are not stored in the buffer (NO), the processing is terminated.

In Step S307, the control unit 45 executes detection processing by way of the first communication unit 50. In other words, in a case in which the mobile telephone device 1 is brought close to the locking side system (the reader 60) (see FIG. 8C), the control unit 45 controls the first communication unit 50 to transmit a signal.

In Step S308, the control unit 45 detects a communication request that was transmitted from the locking side system as processing in Step S401 to be described below.

In Step S309, the control unit 45 transmits key information (a numeric character string), which was stored in the buffer as the processing in Step S303, as a passcode to the locking side system.

Here, descriptions are provided for the operations of the mobile telephone device 1 and the reader 60, from a viewpoint of a processing flow between the mobile telephone device 1 and the reader 60 of the locking side system.

When an induced electromotive force is generated due to a magnetic force that is acquired via the antenna 51 (the loop-type magnetic field antenna), the first communication unit 50 notifies the control unit 45 of information that the induced electromotive force is generated. As a result, the control unit 45 detects the information that that the induced electromotive force is generated, i.e. the information that the device itself is within a range in which communication with the reader 60 is possible (Step S307). Here, the first communication unit 50 responds to the reader 60 with information that communication is possible.

On the other hand, upon receiving the information that communication is possible (Step S400 to be described below), the reader 60 successively outputs a signal for requesting data of the editor application (Step S401 to be described below). Here, since the reader 60 is a device related to the locking side system, a type of a request signal to be transmitted from the reader 60 is a passcode request signal.

The first communication unit 50 receives a passcode request signal (Step S308), and the control unit 45 recognizes the fact that the communication partner is a locking side system, and that a passcode is required to be transmitted. In a case in which the device itself is currently in a standby state, and a numeric character string is stored in the buffer of the memory 44, the control unit 45 controls the first communication unit 50 to transmit the numeric character string as a passcode to the reader 60.

In a case in which the reader 60 side receives the numeric character string as the passcode in response to the passcode request signal (Step S402 to be described below), the processing advances to Step S403 to be described below.

Next, descriptions are provided for operations of the locking side system.

In Step S400, the reader 60 of the locking side system detects the signal that was transmitted from the mobile telephone device 1 as the processing in Step S307.

In Step S401, the reader 60 transmits a communication request to the mobile telephone device 1. In other words, the reader 60 transmits a passcode request signal to the mobile telephone device 1.

In Step S402, the reader 60 receives the numeric character string (the passcode) that was transmitted as the processing in Step S309.

In Step S403, the reader 60 determines whether the information based on the signal that was received as the processing in Step S402 includes a numeric character string (numeric character data). In a case in which a numeric character string is included (YES), the processing advances to Step S404. In a case in which a numeric character string is not included (NO), the processing is terminated.

In Step S404, the reader 60 determines whether the numeric character string received as the processing in Step S402 coincides with a passcode stored beforehand in the memory 62. In a case in which the numeric character string does not coincide with the passcode (NO), the processing is terminated. In a case in which the numeric character string coincides with the passcode (YES), the processing advances to Step S405.

In Step S405, the locking side system unlocks the key provided to the door (i.e. opens the door) (see FIG. 8D).

The above embodiment has been described for a case in which the portable electronic device of the present invention is applied to the mobile telephone device 1. However, the present invention is not limited the aforementioned embodiment, and may also be applied to an electronic device such as a PHS (Personal Handyphone System), a PDA (Personal Digital Assistant), or a portable navigation device.

EXPLANATION OF REFERENCE NUMERALS

1 mobile telephone device (portable electronic device)
11 operation unit (key operation unit)
14 input operation key (first key)
15 selection key (second key)
16 calling key (third key)
21 display unit
45 control unit
46 second communication unit
50 first communication unit
60 reader
61 communication unit
62 memory (storage unit)
63 control unit
100 standard screen
101 non-numeric character string display area
102 numeric character string display area

The invention claimed is:
1. A portable electronic device, comprising:
a first communication unit for performing communication;
a key operation unit including a plurality of first keys, to which numeric characters are assigned, respectively;

a display unit for displaying a numeric character when at least one of the plurality of first keys is operated, the numeric character being assigned to the first key thus operated; and a control unit for controlling the display unit to display a character when any of the first keys is operated in a state where a standard screen is displayed on the display unit, the character corresponding to the first key thus operated, wherein, in a case in which the first communication unit receives a passcode request signal in a state where the numeric character corresponding to the first key thus operated is displayed, the control unit controls the first communication unit to transmit a character string displayed on the display unit to a unit that transmitted the passcode request signal.

2. The portable electronic device according to claim 1, wherein a numeric character and a non-numeric character are assigned as the character to each of the plurality of first keys included in the key operation unit, wherein, each time at least one of the plurality of first keys is operated, the display unit displays both of a numeric character and a non-numeric character assigned to the first key thus operated, and wherein, in a case in which the first communication unit receives the passcode request signal in a state where both of a numeric character string and a non-numeric character string are displayed on the display unit as a result of operating the first keys, the control unit controls the first communication unit to transmit the numeric character string, from among the numeric character string and the non-numeric character string displayed on the display unit, to a unit that transmitted the passcode request signal.

3. The portable electronic device according to claim 2, wherein, in a state where both of a numeric character and a non-numeric character are displayed on the display unit as a result of operating any of the first keys, in a case in which the non-numeric character is converted into another non-numeric character, the control unit controls the display unit to cancel the displaying of the numeric character, and to display only the non-numeric character.

4. The portable electronic device according to claim 2, wherein, in a state where both of a numeric character and a non-numeric character are displayed on the display unit as a result of operating any of the first keys, in a case in which the non-numeric character is determined by operating a second key different from the plurality of first keys, the control unit controls the display unit to cancel the displaying of the numeric character, and to display only the non-numeric character.

5. The portable electronic device according to claim 1, wherein, in a case in which the first communication unit receives a response signal in response to transmitting the character string to the unit that transmitted the passcode request signal, the control unit controls the display unit to display information based on the response signal.

6. The portable electronic device according to claim 1, wherein the operation unit further includes a third key, to which the character is not assigned, but an outgoing telephone call function is assigned, and wherein, in a case in which the third key is operated in a state where numeric characters are displayed on the display unit, the control unit performs control regarding an outgoing telephone call to a telephone number using the numeric characters displayed on the display unit.

7. The portable electronic device according to claim 1, further comprising:

a second communication unit capable of connecting to a public communication network, wherein the plurality of first keys are numeric keys, with which a telephone number can be input for making an outgoing call by way of the second communication unit.

8. The portable electronic device according to claim 1, wherein, in a state where the character is displayed on the display unit as a result of operating any of the first keys in a state where the standard screen is displayed on the display unit, in a case in which the first communication unit receives a signal, and the signal thus received is not a passcode request signal, the control unit controls the first communication unit to perform data communication without using a character string displayed on the display unit.

9. The portable electronic device according to claim 2, wherein the first communication unit is a magnetic field communication unit for performing magnetic field communication, and wherein, in a state where a numeric character is displayed on the display unit as a result of operating any of the first keys, when the magnetic field communication unit receives a signal, the control unit determines whether the signal thus received is a passcode request signal, and in a case in which the signal is not a passcode request signal, the magnetic field communication unit does not execute transmission processing regarding a character string displayed on the display unit.

10. An authentication system, comprising a portable electronic device and a reader for communicating with the portable electronic device, wherein the portable electronic device includes:
a communication unit;
a key operation unit including a plurality of first keys, to which characters are assigned, respectively;
a display unit for displaying a character when at least one of the plurality of first keys is operated, the character being assigned to the first key thus operated; and
a control unit, wherein, in a case in which any of the first keys is operated in a state where a standard screen is displayed on the display unit, the control unit controls the display unit to display a character corresponding to the first key thus operated, and in a case in which the communication unit receives a passcode request signal from the reader in a state where a numeric character corresponding to the first key thus operated is displayed, the control unit controls the communication unit to transmit a character string displayed on the display unit to the reader, wherein the reader includes:
a communication unit for receiving the character string from the portable electronic device in response to the passcode request signal, after transmitting the passcode request signal to the portable electronic device;
a storage unit for storing a passcode for granting authentication; and
a control unit for performing control to execute processing related to authentication, in a case in which a character string received by the reader coincides with the passcode stored in the storage unit.

11. A method of controlling a portable electronic device including: a plurality of first keys to which numeric characters are assigned, respectively; and a display unit, the method comprising the steps of:

displaying a standard screen on the display unit;
displaying a character on the display unit when at least one of the plurality of first keys is operated, the character being assigned to the first key thus operated; and
transmitting a character string to an external device that transmitted a passcode request signal, in a case in which a signal being the passcode request signal is received from the external device in a state where the character string is displayed.

* * * * *